United States Patent [19]
Pecha

[11] Patent Number: 5,597,440
[45] Date of Patent: Jan. 28, 1997

[54] APPARATUS FOR THE ADHESIVE FIXING OF AT LEAST ONE JOINING PART

[76] Inventor: Ernst Pecha, Stauferweg, D-7430, Metzingen, Germany

[21] Appl. No.: 989,600

[22] Filed: Dec. 14, 1992

Related U.S. Application Data

[63] Continuation of Ser. No. 544,317, Jun. 24, 1990, abandoned.

[30] Foreign Application Priority Data

Jul. 5, 1990 [DE] Germany ............... 39 22 066.4

[51] Int. Cl.⁶ .................................................. B32B 35/00
[52] U.S. Cl. ..................... 156/351; 156/358; 156/359; 156/475; 156/499; 156/580; 156/583.1; 156/583.8
[58] Field of Search ............... 156/64, 351, 358, 156/359, 360, 379.6, 380.6, 499, 556, 580, 583.1, 583.8, 475, 538, 539, 535, 583.3; 100/50, 211; 53/64; 219/242, 243, 245, 259, 520, 533, 536

[56] References Cited

U.S. PATENT DOCUMENTS

| | | | |
|---|---|---|---|
| 3,238,080 | 3/1966 | Schluter | 156/351 |
| 3,549,457 | 12/1970 | Carter | 156/556 X |
| 3,906,186 | 9/1975 | Szolis | 219/533 X |
| 4,128,419 | 12/1978 | Kobetsky . | |
| 4,132,583 | 1/1979 | Hodgson | 156/351 |
| 4,222,813 | 9/1980 | Jodrey | 156/540 |
| 4,321,103 | 3/1982 | Lindstrom et al. | 156/358 |
| 4,997,512 | 3/1991 | Manusch | 100/211 X |
| 5,022,954 | 6/1991 | Plaessmann | 156/542 |
| 5,254,189 | 10/1993 | Hirobe et al. | 156/360 |

FOREIGN PATENT DOCUMENTS

| | | |
|---|---|---|
| 2331918 | 1/1974 | Germany . |
| 2338908 | 2/1975 | Germany . |
| 3537670 | 4/1987 | Germany . |

OTHER PUBLICATIONS

Pecha, Ernst: Konfektionierung von Kunstotoff—Kraftstoffbehaltern furden Personenkruftungen VW–Passat In: Kunststoffbemter Apr. 1983, S. 31–3.
German Search Report Oct. 30, 1989.

*Primary Examiner*—David A. Simmons
*Assistant Examiner*—M. Curtis Mayes
*Attorney, Agent, or Firm*—Quarles & Brady

[57] ABSTRACT

An apparatus for the adhesive fixing of a joining part (11) to a resilient workpiece joining point (13) function in such a way that by means of a compensating device (20) the yielding of the joining point (13) is determined according to distance and/or position change and is taken into account during the smoothing adapting of the joining point (13) and during the attachment of the joining part (11) and consequently eliminated. This makes it possible to obtain a high joining quality and constancy.

26 Claims, 2 Drawing Sheets

APPARATUS FOR THE ADHESIVE FIXING OF AT LEAST ONE JOINING PART

This is a continuation of application Ser. No. 07/544,317 filed Jun. 24, 1990, now abandoned.

BACKGROUND OF THE INVENTION

1. Field of the Invention

The invention relates to an apparatus and a method for the adhesive fixing of at least one part, which is to be fixed to a workpiece made from an elastic, resilient and, in particular, material.

2. Prior Art

In the case of elastic, resilient workpieces not directly supportable from the side remote from the joining side against the joining pressure, such as plastic fuel containers produced in the extrusion blowing process and made in particular of higher molecular weight polyethylene, it is difficult to obtain an adequate quality of the connection to the joining part. However, this quality is often of decisive importance, because fuel containers can leak in the joining area. The joining quality is not only dependent on possible deformations of the workpiece during attachment, but also on manufacturing tolerances, which in the case of containers of the aforementioned type are approximately +/−0.5% and therefore very high. Attempts have already been made to compensate these manufacturing tolerances with the aid of a process and an apparatus according to German patent 35 37 670. In this case, prior to the start of a preheating process for plasticizing the workpiece, the position of the joining point is measured in low force manner at the joining point, and as a function of the measured result, the infeeding of a welding unit and the joining part are adjusted via welding stops.

However, no account is taken of the fact that the workpiece, under the pressure of the welding unit and the joining part, resiliently gives way in the vicinity of the joining point and that this does not occur as a parallel displacement, but as a tilting slope, as a function of the position of the joining point. It is also not possible to take account of this deflection as a constant value for similar workpieces, because the deflection is dependent on the wall thickness of the workpiece, manufacturing tolerances, and its ageing state. Less aged workpieces are softer and give way more than more greatly aged workpieces. Thus, the joining quality cannot be improved with the known apparatus and method.

SUMMARY ON THE INVENTION

An object of the invention is to provide an apparatus and a method of the aforementioned type making it possible to avoid the disadvantages of known solutions and permitting the fitting of joining parts with constant quality to workpieces which are elastically flexibly resilient in the vicinity of the joining point.

According to the invention, this object is achieved by an apparatus of the aforementioned type in that a compensating device is provided for the at least partial or substantial elimination of positional changes, which the joining zone has under compressive loads and which occur during an operation either in preparation for the joining process or during the actual joining or both. The device makes it possible to optionally simultaneously determine and eliminate variation due to the manufacturing tolerances. It is also possible to provide separate compensating devices for the amount of resilience and for the nature of the resilience, e.g. a possible tilting of the joining zone.

Appropriately, the arrangement is such that the resilience of the joining zone is not prevented by pneumatic positional securing, but is instead determined by the compensating device immediately in the vicinity of or at the joining zone, and preference is given to a determination by mechanical contact as opposed to non-contact determination. In all cases, as a result of the inventive construction, it is possible to carry out a compressive loading preparation of the joining point for the joining process and a pressing of the joining part during the joining process uninfluenced by the extent and the nature of the position change by which the joining point gives way under the compressive load.

It is admittedly conceivable to provide the inventive apparatus and method, e.g. for adhesive fixtures, by bonding, cold welding, etc., but the preferred use is in fixing by welding, in which the surfaces to be joined together of both the workpiece and the joining part are plasticized by heating to a predetermined depth and, then in the plasticized state, are pressed into one another over a predetermined depth, and after which, cooling takes place for solidifying the joining zone. The inventive construction is also suitable for solid section workpieces, which are elastically resilient like rubber.

Appropriately, according to the invention, a positional sensor for determining the position of the joining point of the workpiece is positioned as close as possible to the joining point and is applied to the associated workpiece surface with such a limited force that the latter does not lead to a yielding positional change of the joining point. Instead, said positional change is brought about under a compressive load by using a separate prestressing device and which is substantially the same as that of a preparatory operation or the actual joining process, so that the prestressing device can be directly formed by the heating device. Using said heating device, the workpiece joining point is preferably suddenly subjected to a predetermined operating pressure, in such a way that it assumes a prestressed yielding position corresponding to said working pressure and which is then determined by the positional sensor as a base value. On the basis of this base value, it is then possible to determine and automatically control the abrasion of the surface of the joining point, e.g. by melting or the penetration of the joining surface of the joining part into the joining point of the workpiece.

If a preparatory adapting process is provided for leveling or smoothing the generally relatively rough or uneven surface of the joining point of the workpiece, and during which, said joining point is loaded with a relatively high contact pressure, then appropriately, there is a determination of the position at the start of this compressive loading, namely, prior to the start of the adapting process, by means of a reference point associated with the joining point. After carrying out the adapting process, the compressive loading is suddenly reduced, so that now, and without the heating unit carrying out the adapting process of penetrating further into the surface of the joining point, the latter is plasticized by heating to a predetermined depth and the joining point can carry with it the heating unit accompanied by the restoring deformation of the workpiece.

While the depth of penetration into the joining point during the adapting process can be measured and controlled by the positional sensor, the plasticizing or preheating process can be controlled in a time-dependent manner. The path or displacement measurement at the start of the adapting process, particularly in the case of a hydraulic drive for the infeeding of the heating unit, is preferably initiated by means of an adjustable pressure switch, which on reaching a given compressive load at which the joining point no longer gives way, is switched over to initiate the path or displacement measurement.

In place of or in addition to the aforementioned adapting or compensating device, it is also advantageous to provide such a device, which further determines any tilting position changes or inclination motion of the joining point under compressive loading, e.g. during the adapting process and/or during the joining process and substantially eliminates the same. This can particularly easily be obtained in that the pressure-loading component is constructed so as to follow in self-adjusting manner the tilting position changes of the joining point. The component can be pivotably mounted about an axis roughly parallel to the joining point infeed direction. This axis is appropriately at right angles to the direction in which the joining point performs the greatest tilting position changes or can assume the greatest inclinations as a result of the mechanical strength ratios of the workpiece. The at least one, or preferably single, positional sensor is advantageously arranged in such a way that it measures in the vicinity of the point were the joining point performs a relatively minimal deflection. Particularly, the positional sensor measures in a plane defined by a line in the axial direction of the device and a pivot axis of a self-adjustment mechanism of the device, said axially plane being oriented roughly at right angles to the surface of the joining point and parallel to the direction of the motion for performing the joining contact.

The invention also proposes a method for the adhesive fixing of at least one joining part, in which at least one operation, e.g. an adapting process or a joining process is performed under compressive loading, the joining point initially being deflected with a compressive load roughly corresponding to joining or adapting compressive load and the maximum deflection position occurring being determined and then the working process being performed in a path or displacement-dependent manner. Thus, the actual working process can be very accurately performed independently of the resilience of the joining point.

Advantageously using the same tool the joining point is adapted under pressure and plasticized in a substantially pressure-free manner, the same tool being usable for plasticizing the joining surface of the joining part on a side of the tool remote from the workpiece.

A particularly advantageous development, especially of a method of the aforementioned type, is obtained in that the joining pressure occurring during the joining process is determined and is related to the joining path for obtaining a test value. The path measuring system can be used for checking the position of the joining part with respect to the joining point or the reference point at the end of the joining process for its production consistency and to process the corresponding values for quality securing measures. The path-dependent control of the joining process is in particular possible when the apparatus is constructed in numerically controlled manner and the extent of the joining path, measured on the path transducer is predetermined. The force to be applied during the joining process for displacing the melt of the plasticized material can be measured and further processed for quality securing purposes. In this case as the measuring device a corresponding force transducer is influenced by the pressing unit moving the joining tool.

BRIEF DESCRIPTION OF THE DRAWINGS

These and further features of preferred developments of the invention can be gathered from the claims, drawings and description, in which the individual features can be realized singly or in the form of sub-combinations in an embodiment of the invention and in other fields and can represent advantageously, independently protectable constructions for which protection is hereby claimed. An embodiment of the invention is described hereinafter relative to the drawings, wherein:

DETAILED DESCRIPTION OF THE PREFERRED EMBODIMENTS

Figure 1:
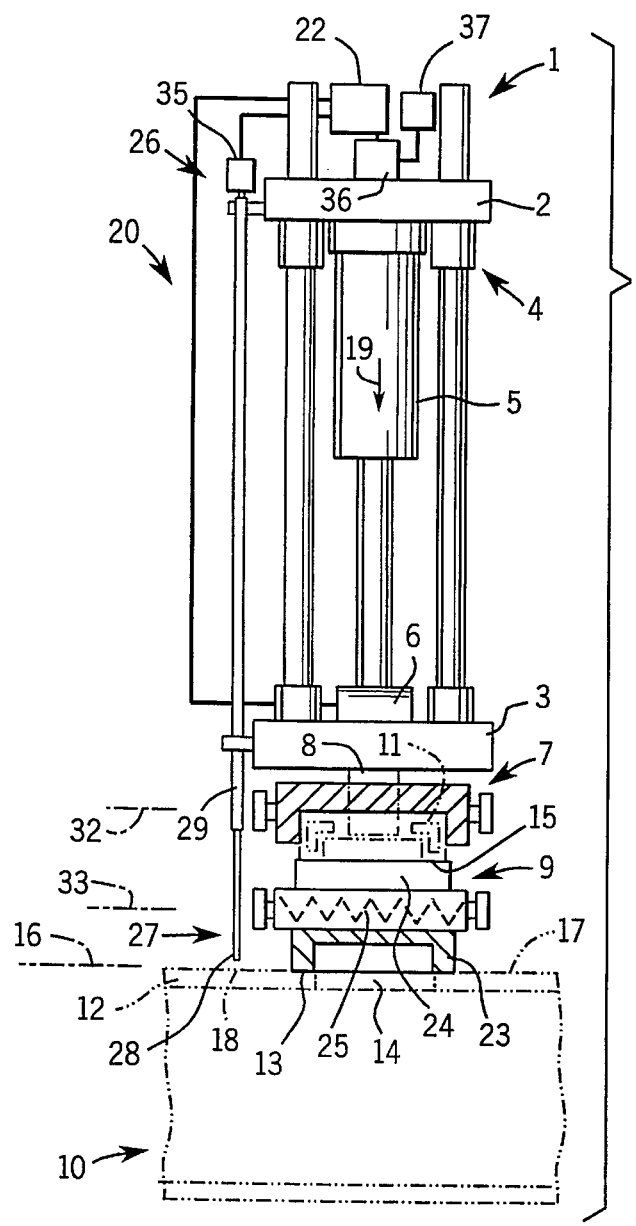
FIG. 1 shows the inventive apparatus in a simplified representation.

The apparatus 1 according to FIGS. 1 to 5 has a frame 2 for the vertical mounting of an underlying slide 3 with guides 4, which can be bar guides. A drive 5 arranged on the frame 2 and which can be formed by a hydraulic or pneumatic working cylinder is used for the displaceable mounting of the slide 3. Between the drive 5 or its piston rod and the slide 3 can be provided a force measuring element or force transducer 6, by means of which the compressive force or torque acting on the slide 3 is determined and by means of a signal line is transmitted to a control device or the like.

On the underside of the slide 3, in the form of a press ram or punch, a joining tool 7 is easily interchangeably fixed by means of a mounting support 8. Below the tool 7 is provided in weight-compensated manner a heating unit 9 of a heating device, which can be laterally displaced with respect to the slide 3 and the joining tool 7, so that it is located in one position in its working area or immediately below the same and in another position laterally outside the working area.

The apparatus 1 is used for attaching a joining part 11 indicated in dot-dash line manner in FIGS. 1 to 5 to an also dot-dash line indicated workpiece 10 by means of heated tool welding. The workpiece 10 is a tank produced by an extrusion blowing process from higher molecular weight polyethylene and which is initially completely closed and from which, after shaping, the waste is removed, followed by weighing and then the cutting out of at least one bore, filling opening or the like. Appropriately, in the same tool fixing, in which these operations are performed, the at least one joining part 11 is attached, and this part 11 can form a smaller filling connection, venting nipple, mounting support for fixing the tank or the like compared with the workpiece 10. The joining part 11 is adhesively fixed to an outside of a wall 12 of the workpiece 10 in the vicinity of a flat joining point 13, which can e.g. closely surround in annular manner a wall bore 14. With the joining point 13 is associated a substantially identically large joining surface 15 on the side of the joining part 11 to be attached and which with the joining point 13 in the joined state determines the joining plane 16 located in a workpiece surface 17. The joining part 11 is appropriately formed by an injection molded part from a similar weldable material to the workpiece 10. As close as possible to the outer circumferential boundary of the joining point 13, a very small area reference point 18 is determined on the workpiece surface 17 for the relative path measurement between the joining point 13 and the tool unit to be engaged therewith in the joining direction of arrow 19.

Figure 2:
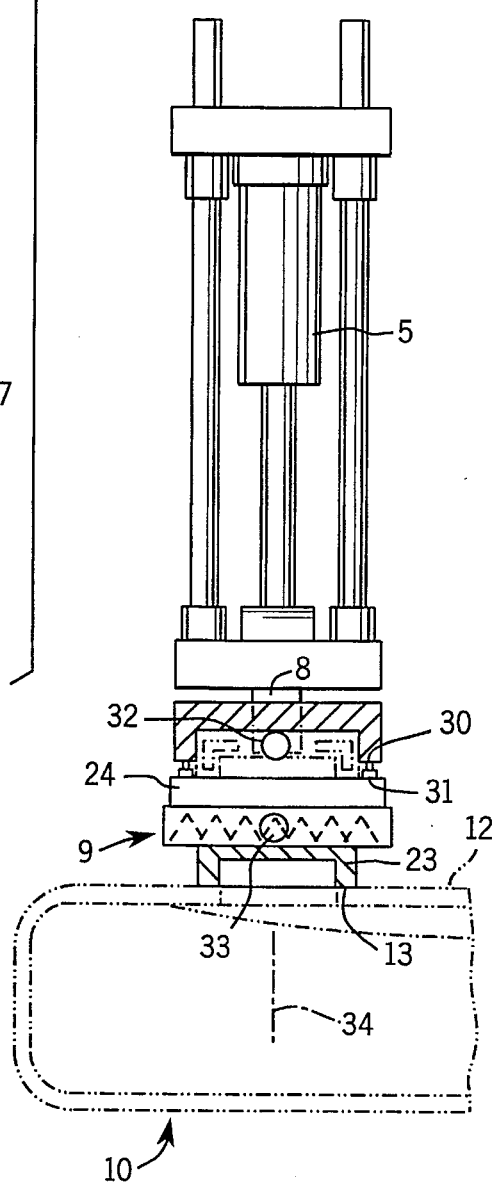
FIG. 2 shows a side view of the apparatus according to FIG. 1.
Figure 4:
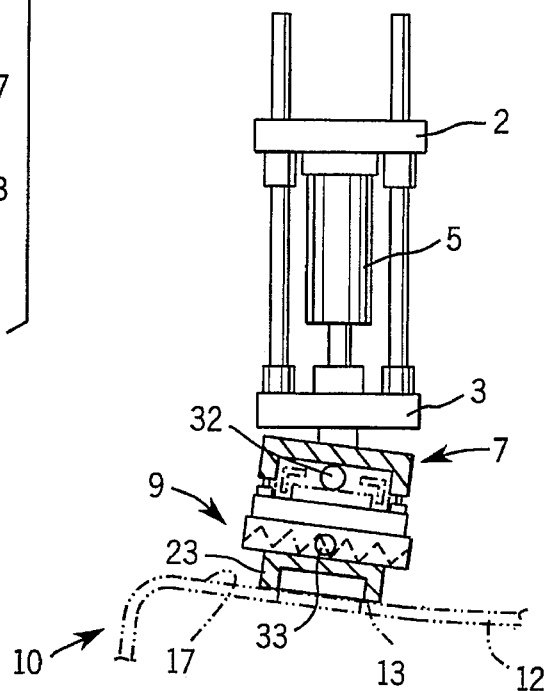
Figure 5:
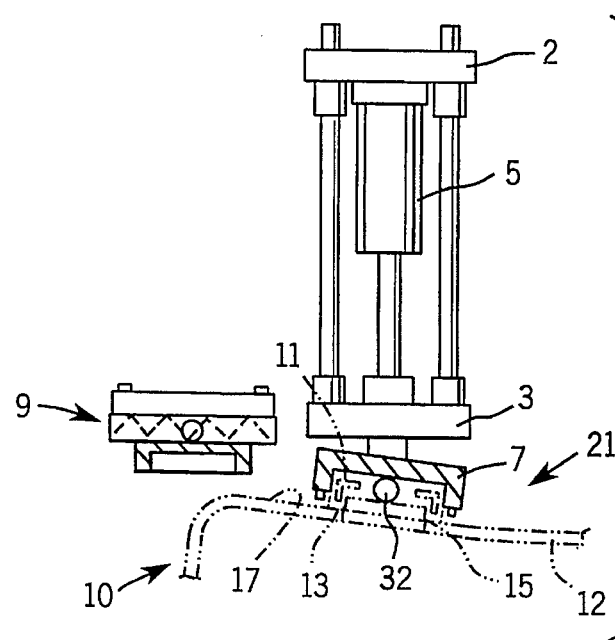

The joining point 13 or the wall 12 is, in the case of heating element welding, loaded with welding pressures or forces applied by a prestressing device directed at right angles to the joining plane 16 and which are approximately 3 to 5 kp/cm². Under these forces and as indicated in FIGS. 2, 4 and 5, the wall elastically gives way in the direction of arrow 19, i.e. in the direction of its inside. This not only leads to a change in its position relative to a reference plane of the apparatus frame 2 roughly at right angles to arrow 19, but also the joining point 13, due to its different spacings with respect to adjacent transverse walls, can simultaneously pivot relative to said reference plane by a few radians into a tilting position, so that it is no longer in a plane at right angles to the infeed or joining direction of arrow 19 and instead a tilted welding or joining plane 16 is obtained. For compensating the give-way distance of joining point 13, a compensating device 20 is provided. According to the invention, the device 20 can be formed by rigid stops or could have such stops, which are located on the heating unit 9 and on the joining tool 7, and in the case of heated tool welding, can be supported at the end of the adapting process or at the start of the preheating or plasticizing process in the vicinity of the then larger surface reference point of the workpiece surface 17, while the stops of the joining tool 7 are then correspondingly supported at the reference point. Thus, in both operations, the position of the tool unit could be established with respect to the joining point 13 independently of the extent of the yielding of the wall 12 having the joining point 13.

Appropriately, the compensating device 20 has control device 22 which, besides the force transducer 6, is also influenced by a measuring device 26, which with the aid of a measuring member 27 determines the position of the reference point 18 under said compressive loading of the wall 12 and simultaneously any tolerance differences in the workpiece height parallel to joining direction arrow 19. The measuring or determining member 27 can have a pin-like positional sensor 28 displaceable relative to a sensor mounting support 29 in the direction of arrow 19 and whose end determines the position of the joining point 13 by mechanical sensing of the reference point 18. The sensor mounting support 29 can be fed in with the slide 3 counter to the joining point 13 and is then adjustable for path measurement during the joining process counter to arrow 19 with respect to slide 3. However, it can also be displaceably mounted on the frame 2, so that at the start of the adapting process, it can be fed in with the slide 3 against joining point 13 and then up to the end of the joining process is fixed relative to the frame 2 and during the entire time the positional sensor 28 remains in engagement with the reference point 18.

The heating unit 9 has a flat heating element 25 which can be operated with an electrical resistance heating means and on whose underside is provided a heat conducting, plate-like heating member 23 for heating the joining point 13 during the adapting process and also during the plasticizing process and on whose top is provided a heat conducting, plate-like heating member 24 for plasticizing and optionally for prior surface adaptation of the joining surface 15 of the joining part 11. The end position of the joining tool 7 for the positionally secured reception of the joining part 11 with respect to the heating member 24 in the direction of arrow 19 is rigidly fixed by stops 30 and by counterstops 31, which are provided on the facing sides of the joining tool 7 and the heating member 24 close to the outer circumference of the joining surface 15. Optionally, the stops 30 of the joining tool 7 could also compensate the resilience during the joining process in the described manner, but are appropriately arranged in such a way that they remain contact-free with respect to the workpiece 10 or the workpiece surface 17 during the joining process.

The positional sensor 28 acts on a transducing element 35, e.g. an inductively operating displacement transducer, which acts by means of a signal line on the same control device 22 as the force transducer 6. This control device 22 acts via a control line on a valve control mechanism 36 for the pressurizing and pressure relief of the drive 5, said control mechanism 36 appropriately having pressure proportional valves making it possible to automatically set the different pressures and forces for the adapting process, the preheating or plasticizing process and the joining process which are advantageous for an optimum welding operation, and by means of a voltage, the pressure from the pressure source 37 is correspondingly controlled.

Figure 3:
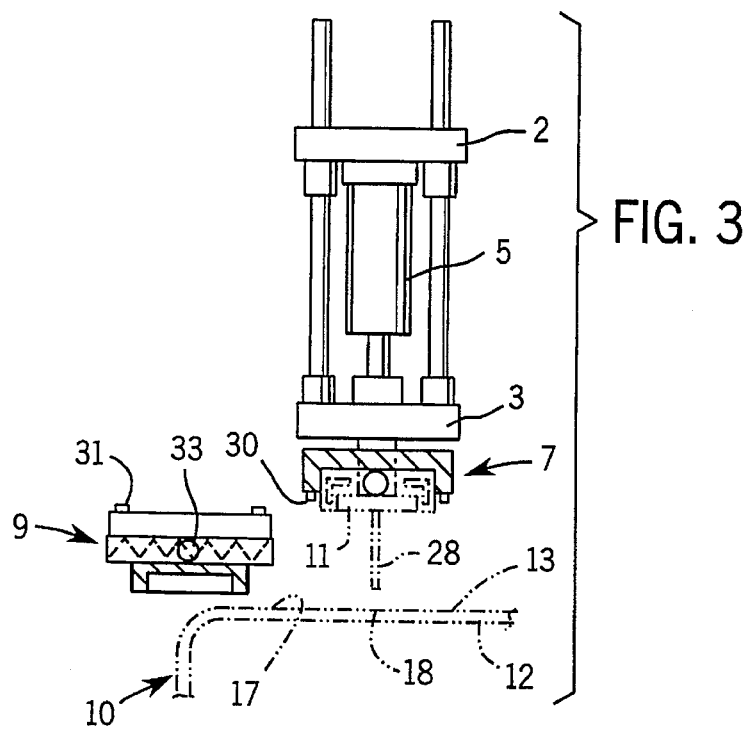
FIGS. 3 to 5 show successive operating phases of the apparatus in a side view according to FIG. 2.

For attaching a joining part 11 to the joining point 13 of a workpiece 10, the joining part 11 is inserted in the joining tool 7 and then the heating unit 9 is brought from the position according to FIG. 3 from a side located outside the positional sensor 28 into its working position between the joining tool 7 and the joining point 13. The pressing unit having the slide 3 is moved with the joining tool 7 against the heating unit 9, which is also movable in the direction of arrow 19 and is appropriately hydraulically or pneumatically operated.

A pressure loading component presses the heating unit with a clearly defined adapting force, adjustable by means of a pressure proportional valve, against the joining point 13, which gives way dependently of said force until a state of equilibrium is reached. During the infeed of the pressing unit, the positional sensor 28 rests on the reference point 18. On reaching the state of equilibrium a pressure builds up in the pressure system and is processed by means of an adjustable pressure switch for initiating the path or displacement measurement.

The path or relative movement of the heating unit 9 with respect to the reference point 18 of the workpiece surface 17 in infeed direction 19 is now measured. This measurement takes place independently of the deformation of the wall 12 during the force application during the compensating process. For technical and economic reasons, this force is made relatively high, so that the compensating process can be performed as quickly as possible.

The amount by which the joining point 13 is melted during the compensating or adapting process is predetermined on the basis of the unevennesses of the workpiece surface 17 in the vicinity of the joining point 13, established by statistical measurements and increased by a safety allowance of a few ¹⁄₁₀ mm, so that there can be a melting amount of less than 1 mm, e.g. 0.8 mm. This melting amount is stored and can be adjusted on the path measuring system, e.g. on the control device 22.

If the heating unit 9 has covered the path corresponding to this melting amount, the hydraulic pressure on the proportional valve is reversed, namely reduced in such a way that the heat of the heating member 23 can penetrate the lower layers of the wall, e.g. over roughly 1 mm while plasticizing the material, without any displacement of the material melt formed.

As a result of the reduced pressing pressure, the aforementioned state of equilibrium no longer exists, and the joining point 13 or the wall 12 returns, under its restoring force, by a corresponding amount towards its relaxed starting state until once again a state of equilibrium corresponding to the reduced pressure is reached. The joining point 13 carries the pressing unit with it, whereas the sensor mounting support 29 remains fixed with respect to the frame 2 or the workpiece receptacle due to its location, so that the positional sensor 28 can determine the return path of the almost pressureless wall 12 with respect to the heating member 23. Despite the new state of equilibrium, there is still a certain after-run or a further slight return of the workpiece, which is also determined by the path measuring system.

As the joining parts 11 generally have very small manufacturing tolerances, the melting amount thereof during the compensating process of the joining surface 15 can be added as a fixed amount to the path measurement. The path of the joining part 11 relative to the heating member 24 during this adapting process is determined by the adjustable stops 30, 31, which can e.g. be formed by stop screws parallel to the joining direction of arrow 19.

The plasticizing or preheating of the joining point 13 or the joining surface 15 is controlled in a time-dependent manner, e.g. by means of an adjustable clock and the plasticized depth in the wall 12 or in the joining part 11 can be determined via the duration of the preheating time and via the temperature of the heating member 23 or 24. At the end of this time the pressing unit returns from the infeed position according to FIG. 4 into a starting position and the heating unit 9 travels at right angles thereto in a pivoting movement out of the joining area into its starting position according to FIGS. 3 and 5.

The hydraulic pressure of the drive 5 for the pressing unit is reversed to welding or joining pressure, i.e. increased, so that the joining tool 7 with the joining part 11 runs up on to the joining point 13 and under said force presses against the wall 12 and the material melts of the joining point 13 and the joining surface 15 penetrate one another. This compressive loading can lead to a different deformation of the wall 12 or resilience of the joining point 13 as compared with the adapting process and the extent by which the melts penetrate one another can be determined via positional sensor 28 and can be fixed by the control mechanism. However, the path measuring system can also be used for checking the position between the joining point 11 and the reference point 18 for its manufacturing consistency, particularly if a predetermined joining pressure is used as a basis. The joining tool is a component of a joining means 21 or contacting.

As can also be gathered from FIGS. 1 to 5, appropriately the joining tool 7 is self-adjustably pivotably mounted by a few radians on mounting support 8 about a pivot axis 32 roughly parallel to the joining plane 16 or at right angles to the joining direction 19. The pivot axis 32 is roughly in the center of the extension of the joining tool 7 which is at right angles thereto. The heating unit 9 or at least the heating member 23 is self-adjustably pivotable with respect to a not shown mounting support about a pivot axis 33 located roughly parallel to the pivot axis 32 and in the associated median plane of the heating members 23, 24. The two pivot axes 32, 33 are appropriately as close as possible to one another or in the vicinity of the facing sides of the joining tool 7 and the heating unit 9, as well as close as possible to the plane of the joining surface 15 or at the heating surface of the heating member 23. The positional sensor 28 or the reference point 18 with respect to the position of the joining tool 7 or the heating unit 9 are so selected that they are located on the side of these components traversed by the pivot axes or pins 32, 33, preferably roughly in the common axial plane of the pivot axes 32, 33 parallel to arrow 19. The position of the pivot axes 32, 33 with respect to the workpiece 10 or the wall 12 is appropriately chosen in such a way that the pivot axes 32, 33 are at right angles to the direction in which the joining point 13 can assume the greatest tilting slope on giving way or yielding.

As shown in FIG. 4, during the compensating process, the heating member 23 can be self-adjustably influenced by the joining point 13 and can also slope the same, so that there is a constant specific contact pressure over the entire extension of the joining point 13. Thus, the heating unit 9 is sloped parallel to the joining tool 7, so that the relative position between these two components is not influenced by said tilting position. In the same way, during the joining process according to FIG. 5, the joining tool 7 can alone slope in self-adjusting manner, so that the joining pressure between the joining point 13 and the joining surface 15 is distributed in a constant manner over the extension thereof.

I claim:

1. An apparatus for adhesively fixing at least one joining part (11) to a workpiece (10) in the vicinity of a joining point (13) of a substantially elastically flexible workpiece surface (17) having a give-way resiliency, said apparatus comprising:

means (5) for applying a compressive force to said workpiece (10) to cause the joining point (13) to undergo a resilient displacement according to the give-way resiliency;

detecting means (26) for detecting the give-way resiliency of the joining point;

joining means (21) for adhesively fixing the joining part (11) to the joining point (13) under a compressive joining force resulting in a resilient joining displacement of the joining point (13), said resilient displacement and said resilient joining displacement of the joining point being substantially equi-directional; and control means (20) for substantially eliminating the effects of the resilient joining displacement of said joining point (13) caused by the compressive joining force, said compressive force being substantially equal to said compressive joining force caused by said fixing of the joining part (11), said control means (20) being provided for operating said joining means (21) as a function of said resilient displacement of the joining point (13) as detected for the joining point by said detecting means (26).

2. The apparatus according to claim 1, wherein said workpiece surface defines a joining plane, said workpiece surface being elastically flexible in a joining direction transverse to said joining plane, said apparatus further including welding heating means for thermally plasticizing said joining point, said welding heating means being movable relative to the workpiece surface in an approaching direction substantially transverse to said joining direction.

3. The apparatus according to claim 2, wherein said control means is provided for controlling operation of said heating means as a function of said displacement of said joining point, said detecting means including a position detecting sensor for determining the displacement of the joining point in said joining direction at least when said joining point is under said compressive force.

4. The apparatus according to claim 3, wherein said heating unit provides a prestressing device for preloading said workpiece surface prior to thermally plasticizing the joining point to provide a prejoining deflection of said Joining point to a prejoining position under a prejoining pressure of substantially equal value to an application pressure of said heating means for thermally plasticizing said surface.

5. The apparatus according to claim 4, further comprising means for displacing said position detecting sensor as a function of said prejoining deflection, when the workpiece surface is deflected towards the joining position said control means being operationally controlled by said position detecting sensor.

6. The apparatus according to claim 5, wherein said means for displacing includes a compensating device for setting an initial reference state as a function of said prejoining pressure when the workpiece surface is deflected to the prejoining position.

7. The apparatus according to claim 3, wherein said heating means lowers the workpiece surface in the vicinity of the joining point by melting, thereby defining a melting depth, said control means including measuring means for measuring the melting depth in the vicinity of said joining point of said workpiece.

8. The apparatus according to claim 7, wherein said measuring means determines a penetration depth in said joining direction between a reference point of the workpiece surface adjacent to said joining point and a distal end of a heating member of said heating means associated with said workpiece surface when said heating member penetrates said workpiece surface.

9. The apparatus according to claim 3, further comprising pressure control means for reducing an application pressure exerted on said workpiece surface by said heating means to a lower application pressure provided for plasticizing said joining point, said reduction occurring when said heating member penetrates said workpiece surface over a predetermined depth of the workpiece, said application pressure being reduced as a function of an approaching value measured between said joining point and said heating unit, said plasticizing occurring substantially without disturbing the workpiece wall at greater than a predetermined depth of the workpiece.

10. The apparatus according to claim 1, wherein said detecting means includes a position detecting sensor for detecting the displacement of the joining point under said compressive force defined by a preset given force.

11. The apparatus according to claim 10, wherein said sensor includes a measuring member that engages said workpiece surface in a sensing position during at least one of:
   a phase in which the joining point is plasticized; and
   a phase in which the joining part is joined to the workpiece.

12. The apparatus according to claim 10, wherein said sensor includes a measuring member that engages and determines the position of said workpiece surface directly adjacent to said joining point at a reference point.

13. The apparatus according to claim 1, further including a heating unit for melting the workpiece surface, said heating unit being removably approachable towards the workpiece surface in an approaching direction parallel to a plane of the workpiece surface, said detecting means including a position detecting sensor for detecting the position of said joining point, said sensor being displaceable commonly with said heating unit in said approaching direction into a sensing position engaging said workpiece surface when said workpiece surface is resiliently displaced.

14. The apparatus according to claim 13, wherein said position detecting sensor is a mechanical sensor displaceable into touching contact with said workpiece surface adjacent to said joining point and with a sensing pressure lower than said compressive force.

15. The apparatus according to claim 1, wherein said joining means are provided for moving said joining part relative to said workpiece from a contact position to an immersing position wherein the difference between contact and immersing positions defines an immersing depth, control means being provided for controlling said immersing depth of said joining means as a function of said displacement determined by a path detecting sensor for determining said displacement of said workpiece surface in the vicinity of said joining point.

16. The apparatus according to claim 15, wherein said control means includes an immersing means for controlling said immersing depth as a function of the path detecting sensor's determination of said displacement, wherein said immersing depth is defined by a joining path beginning at a first contact between said joining point and said joining part and ending at a final depth of engagement of said joining part and the joining point.

17. The apparatus according to claim 1, wherein said joining means is provided for joining said joining part to said workpiece surface with a joining pressure, a pressure detecting means being provided for detecting said joining pressure.

18. The apparatus according to claim 1, wherein a position detecting sensor for determining said resilient displacement measures in the vicinity of a zone of reduced resiliency of said workpiece, said zone being located laterally adjacent to said joining point.

19. The apparatus according to claim 18, wherein said position detecting sensor is located substantially in an axial plane of a pivot axis substantially parallel to a joining plane defined by said workpiece surface, at least one of tools provided by:
   a heating tool; and
   a joining tool, being pivotable about said pivot axis.

20. The apparatus according to claim 1, wherein said joining means provides a prestressing device or preloading said workpiece surface prior to adhesively fixing the joining part to the joining point to provide a prejoining deflection of said joining point to a prejoining position under a prejoining pressure of substantially equal value to an application pressure of said joining means.

21. The apparatus according to claim, 20, further comprising means for displacing said position detecting sensor as a function of said prejoining deflection, when the workpiece surface is deflected towards the joining position said control means being operationally controlled by said position detecting sensor.

22. The apparatus according to claim 21, wherein said means for displacing includes a compensating device for setting an initial reference state as a function of said prejoining pressure when the workpiece surface is deflected to the prejoining position.

23. An apparatus for adhesively fixing at least one joining part to a workpiece in the vicinity of a joining point of an associated substantially elastically flexible surface of said workpiece, said associated surface of said workpiece defining a joining plane, said apparatus comprising:
   a heating tool for heating the joining point;
   a joining tool for applying said joining part to said joining point, said joining tool including a support structure;
   feeding means for feeding said support structure towards said joining point along an approaching movement and an approaching direction oriented traverse to said joining plane; and
   means for applying a compressive force to the workpiece to cause the joining point to resiliently undergo inclination motions according to the give-way resiliency;
   wherein at least one of said tools is self-adjustably mounted to said support structure to adapt to different inclination positions and inclination motions of said joining point caused by application of said at least one of said tools.

24. The apparatus according to claim 23 wherein at least one of said tools is provided to apply a compressive force to the Joining point substantially parallel to said approaching direction and to simultaneously cause said inclination motions, said feeding means including a guide displaceably guiding said at least one tool over said approaching movement.

25. An apparatus for adhesively fixing at least one joining part to a work piece in the vicinity of a joining point of an associated substantially elastically flexible surface of said workpiece, said apparatus comprising:

a heating tool for heating the joining point, and a joining tool for applying said joining part to said joining point; and means for applying a compressive force to the workpiece to cause the joining point to resiliently undergo inclination motions according to the give-way resiliency;

wherein at least one of said tools is self-adjustably mounted to a single support structure to adapt to different inclination positions and inclination motions of said joining point caused by application of said a least one of said tools; and wherein at least one of said tools is pivotally mounted about a pivot axis located substantially in a single axial plane, said axial plane being oriented substantially parallel to a direction of an approaching movement of said tool to said workpiece surface.

26. An apparatus for adhesively fixing at least one joining part to a workpiece in the vicinity of a joining point of a substantially elastically flexible workpiece surface comprising:

a connecting device for connecting said joining part to said joining point with a joining pressure causing resilient positional displacement of said joining point up to a displaced end position;

detecting means for detecting said end position; and control means operated by said detecting means for followingly adjusting said connecting device commonly with said positional displacement of said joining point to substantially achieve said end position and to loin the joining part to the joining point when substantially in said displaced end position.

* * * * *

UNITED STATES PATENT AND TRADEMARK OFFICE
CERTIFICATE OF CORRECTION

Patent No.  : 5,597,440
Dated       : January 28, 1997
Inventor    : Ernst Pecha It is certified that error appears in the above-identified patent and that said Letters Patent is hereby corrected as shown below:

On the Title Page

--[73] Assignee: bielomatik Leuze GmbH & Co.-- should be inserted above "[21] Appl. No. 989,600".

Col. 7, line 11, after "member" delete ".".

Claim 21, line 1, after "claim" delete ",".

Signed and Sealed this

Eighth Day of July, 1997

Attest:

Attesting Officer

BRUCE LEHMAN

Commissioner of Patents and Trademarks